Feb. 4, 1958     K. G. WENDT     2,821,788
TIMING GEAR SETTING TOOL
Filed July 8, 1954
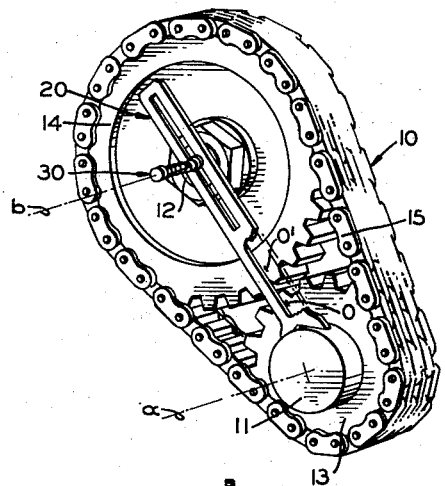
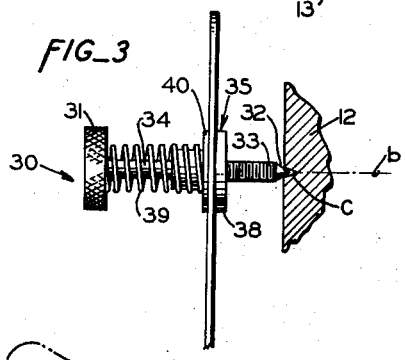
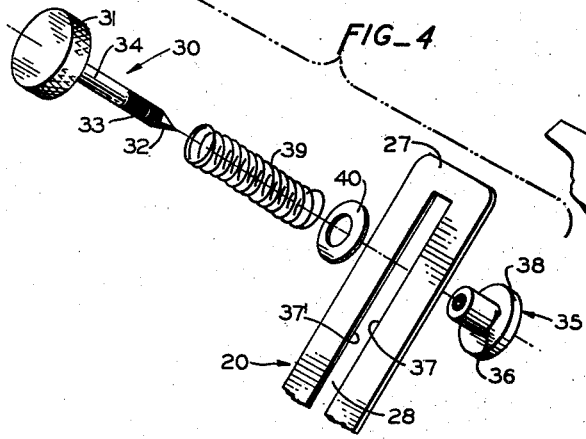
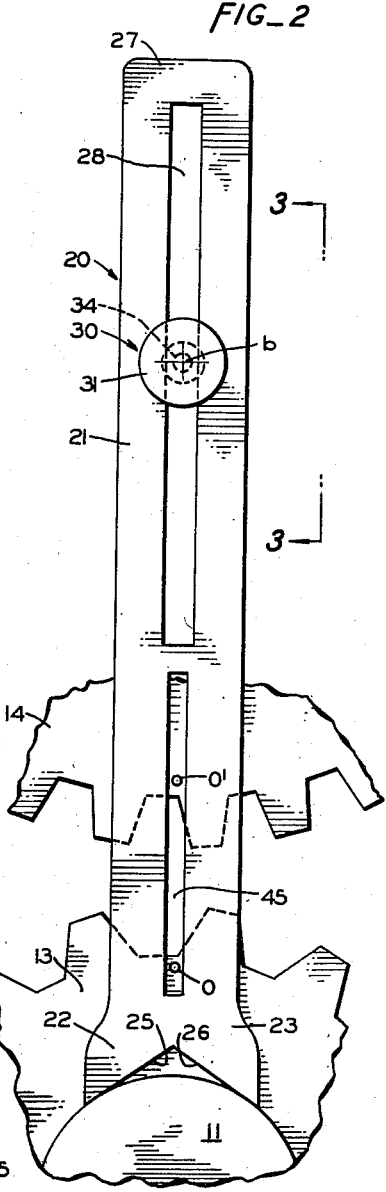
INVENTOR.
KARL G. WENDT
BY
*Hansen and Lane*
HIS ATTORNEYS

United States Patent Office 2,821,788
Patented Feb. 4, 1958

2,821,788

TIMING GEAR SETTING TOOL

Karl G. Wendt, Cupertino, Calif.

Application July 8, 1954, Serial No. 441,971

2 Claims. (Cl. 33—181)

This invention relates to automotive mechanics' tools and more particularly to a timing gear setting tool.

In automotive engines or the like, it is conventional to provide a cam shaft coordinated with a crankshaft in such a manner as to turn the cam shaft in timed relation with the crankshaft. In this connection, it is customary to drivingly connect the cam shaft to the crankshaft by a chain and sprocket or gear arrangement of proper ratio. Each of these gears is keyed to its respective shaft for turning movement therewith. To assist the mechanic in properly setting the timing gears and chain each gear or sprocket has impressed or embodied thereon a timing "0" mark so placed that when the "0" mark of each gear is congruent to a line struck from center to center of the cam shaft and the crankshaft, the valve and ignition system of the engine will be in proper setting with the respective pistons of the engine.

As is well known, the timing gears and chain of most engines are up front of the engine block, behind the radiator and grille therefor. Consequently, it is difficult for a mechanic to sight a line between the crankshaft and camshaft incident to placement of the "0" marks on the gears congruent thereto. It is all the more difficult to hold a straight edge between the axes of the crankshaft and camshaft and to sight their alignment through the radiator grillwork, much less position the "0" marks on the timing gears on the line so established. It is the purpose of the present invention to provide a simple yet effective tool for establishing a straight line between the axes of the camshaft and crankshaft of an engine.

Another object of this invention is to provide a tool for establishing a straight line between the axes of a camshaft and crankshaft with a sight opening along that line for visually registering the "0" marks on the timing gears therewith.

It is another object of this invention to provide a tool as stated above which is self centering with respect to the axes of the camshaft and crankshaft. In this connection it is a further object of this invention to provide such a tool with means for securing the same to the crankshaft and camshaft with positive assurance of alignment of such tool between the axes of said shafts.

These and other objects of the present invention will become more apparent from a reading of the following specification and claims in the light of the drawings in which:

Fig. 1 is a perspective view of the timing gear and chain assembly of an automotive engine having the timing gear setting tool of the present invention in place thereon.

Fig. 2 is an enlarged front view of the tool shown in Fig. 1 with parts of the timing gears shown fragmentarily.

Fig. 3 is a side view of part of Fig. 2 as seen from line 3—3 therein.

Fig. 4 is an exploded perspective view of the sub-assembly illustrated in Fig. 4.

Referring to Fig. 1, the timing gear arrangement generally designated 10 consists of a crankshaft 11 having its axis $a$ disposed in spaced parallel relation with respect to the axis $b$ of a camshaft 12. A gear 13 is keyed to the crankshaft 11 for turning movement therewith and a gear 14 is likewise keyed to the camshaft 12 for turning therewith. These two gears 13 and 14 are drivingly connected by a timing chain 15, it being understood that the timing gears 13 and 14 are in proper ratio so as to turn in timed relation so that the valve and ignition mechanism (not shown) related to the camshaft will operate in sequence with the stroke of the pistons (not shown) related to the crankshaft.

The foregoing presupposes a proper setting of the two timing gears 13—14 relative to each other and to this end each of these gears has a mark "0" and "0'," respectively, thereon. These marks "0" and "0'" are predisposed on the respective timing gears 13 and 14 in direct relation with the key and slot connection of each with its respective shaft 11 and 12 to set the camshaft in timed relation with the crankshaft.

Ofttimes the timing chain 15 will break or slip out of mesh with one or the other timing gear 13 or 14. It is well known that some play must be allowed in chain drives and this plus additional wear and tear might cause the chain 15 to jump a cog and thus throw the engine out of time. In either event it is not always necessary to remove the radiator or radiator grille from the vehicle. Neither is it necessary to remove the timing gears 13—14 from their respective shafts. However, in order to attain an accurate setting and alignment of the "0" marks on the two gears 13—14 much labor and time is lost due to the normal inaccessibility to the timing gear arrangement. To minimize labor costs the present invention contemplates a tool 20 which can be placed relative to the timing gear arrangement after removal of a cover plate which usually conceals the same.

The tool 20 comprises a flat strip of material 21 which preferably is non-magnetic or non-ferrous in character. This strip 21 is of a length suitable to span the distance between the two shafts 11—12 and of a width sufficient to attain structural rigidity. As best seen in Fig. 2, the strip 21 has a fish tail formation 22 at one of its ends 23 to provide a crotch therein. In this connection the fish tail formation is formed by cutting into the end 23 a pair of diagonally disposed edges 25—26 disposed at an obtuse angle with respect to each other and converging at the longitudinal axis of the strip 21. In this manner the crotch thus formed affords seating engagement of the end 23 upon the outer wall of a round shaft such as the crankshaft 11. Thus it will be seen that when the angularly disposed edges 25—26 have tangential engagement with the wall of the shaft 11, the longitudinal axis of the strip 21 will be disposed radially with respect to the axis $a$ of shaft 11.

The opposite end 27 of the strip 21 is provided with a wide guide slot 28 formed congruent to the longitudinal axis of the strip 21 and extending approximately to the mid portion of the strip 21. Arranged for sliding movement in this axial guide slot 28 is a centering pin 30. This pin 30 extends through the guide slot 28 with its axis perpendicular to the longitudinal axis of the strip 21 and for sliding movement in a plane coincident therewith.

The centering pin 30, Figs. 3 and 4, has a knurled head 31 and a pointed opposite end 32 with adjacent threading 33 on its shank portion 34. The threaded end 33 of the pin 30 is adapted for connection with a threaded sleeve 35 having one end provided with flat parallel undercuts 36—36' for surface contact with the marginal edges 37—37' of the guide slot 28. This undercut end of the sleeve 35 is secured to a washer 38 disposed on the back side of the strip 21 for maintaining the threaded sleeve 35 in position on the strip 21 for sliding movement relative to the guide slot 28 therein.

A yieldable means in the form of a compression spring 39 circumscribes the shank of the pin 30 and bears against the head 31 of the pin and a washer 40 mounted on the projected end of the sleeve 35 to press the washer 40 against the strip 21 to frictionally hold the sleeve 35 in a desired position of adjustment lengthwise relative to the guide slot 28 formed in the strip 21. By turning the pin 30 in one direction the compressive force of the spring 39 against the washer 40 is increased to induce greater frictional traction between the latter and the strip 21. By releasing the pressure upon the spring 39 the washer 40 can slide more easily relative to the strip 21 during adjusting of the pin along the guide slot 28.

From the foregoing it will be apparent that the axis of the centering pin 30 can be aligned with the axis of the camshaft 12 irrespective of the variety of distances between the latter and the related crankshaft 11 for different makes of engines. With the present tool 20 the pointed end 32 of the pin 30 is placed in the center bore C at the end of the camshaft 12 and the fish tail end 23 of the strip 21 forced into engagement with the wall of the crankshaft 11. In this position the longitudinal axis of the strip 21 is disposed in a straight line between the axis $a$ of the crankshaft and the axis $b$ of the camshaft.

As illustrated in Fig. 2, the strip 21 is provided with an elongated slit or sight opening 45 coinciding axially with the longitudinal axis of the strip 21. This sight opening 45 extends from the midportion of the strip 21 to the fish tail end 22 of the latter so that the peripheral rims of the two gears 13 and 14 can be seen therethrough. The opening 45 being a slit is very narrow so that its marginal edges parallel to the axis of the strip 21 are in close proximity to such axis. In this manner each of the gears 13 and 14 can be turned in either direction until the timing "0" marks thereon are visible through the sight opening 45. Thus the timing gears 13—14 are set to receive the timing chain 15 while the marks "0" and "0'" on the respective gears 13—14 are visible through the sight opening 45.

In connection with the foregoing, the tool 20 is secured in position relative to the crankshaft 11 and camshaft 12 by magnetic attraction. This is accomplished by magnetizing the centering pin 30 so that its pointed end 32 is attracted into the center bore C in the camshaft while the fish tail end 22 of the strip 21 rests upon the round of the crankshaft 11. In this manner the tool 20 is held in place relative to the timing gear arrangement 10, to establish a line between the axes $a$ and $b$ of the camshaft and crankshaft. Thus the mechanic is free to use both hands in turning the gears 13 and 14 until their "0" marks are visible through the sight opening 45 in the tool. If need be the mechanic can use a mirror to see the sight opening by reflection from a side angle. Moreover, he can look through the honeycomb of the radiator or through the radiator grille to ascertain whether the "0" marks are aligned. In any event much time and labor is saved due to the fact that many accessories around the timing chain arrangement need not be removed. In addition to the foregoing, exact alignment can be attained with assurance during replacement of the timing chain 15 around the gears 13—14.

While I have described my new timing gear setting tool in specific detail, it will be apparent that it is susceptible to variation, modification and/or alteration without departing from the spirit of my invention. I therefore desire to avail myself of all variations, modifications, and/or alterations as fairly come within the purview of the appended claims.

What I claim as new and desire to protect by Letters Patent is:

1. A tool for setting timing gears on a pair of spaced shafts so as to register predisposed "0" marks on said timing gears with a radial line extending between the axes of said spaced shafts, comprising a flat strip of rigid material having a fish tail crotch formation at one end provided by angularly disposed edges tangentially engageable with the round wall of one of said shafts and converging at the longitudinal axis of said strip, a guide slot formed in said strip congruent to the long axis thereof and adjacent its opposite end, a threaded sleeve arranged for sliding movement in said guide slot, a centering pin threaded through said threaded sleeve and having a pointed end adapted to seat in a center bore formed in the end of said camshaft, yieldable means between said strip and said centering pin for frictionally setting the latter relative to said strip when the pointed end of said pin is seated in the center bore of said camshaft, and a sight opening formed in said strip coaxial with a line struck between the center of said crotch formation and said centering pin for viewing the "0" marks of said gears therethrough.

2. A tool for setting timing gears on a pair of spaced shafts so as to register predisposed "0" marks on said timing gears with a radial line extending between the axes of said spaced shafts, comprising a flat strip of rigid, non-magnetic material having a fish tail crotch formation at one end provided by angularly disposed edges tangentially engageable with the round wall of one of said shafts and converging at the longitudinal axis of said strip, a guide slot formed in said strip congruent to the long axis thereof and adjacent its opposite end, a threaded sleeve arranged for sliding movement in said guide slot, a centering pin threaded through said threaded sleeve and having a magnetized pointed end adapted to seat in a center bore formed in the end of said camshaft, yieldable means between said strip and said centering pin for frictionally setting the latter relative to said strip when the pointed end of said pin is seated in the center bore of said camshaft, and a sight opening formed in said strip coaxial with a line struck between the center of said crotch formation and said centering pin for viewing the "0" marks of said gears therethrough.

References Cited in the file of this patent

UNITED STATES PATENTS

| 737,560 | Nunnally | Aug. 25, 1903 |
| 804,067 | Stowe | Nov. 7, 1905 |
| 809,037 | Walker | Jan. 2, 1906 |
| 953,464 | Heller | Mar. 29, 1910 |
| 2,341,796 | Kuna et al. | Feb. 15, 1944 |

FOREIGN PATENTS

| 249,105 | Germany | July 11, 1912 |
| 442,006 | Germany | Mar. 18, 1927 |